US006374226B1

(12) United States Patent
Hunt et al.

(10) Patent No.: US 6,374,226 B1
(45) Date of Patent: Apr. 16, 2002

(54) SYSTEM AND METHOD FOR INTERFACING SPEECH RECOGNITION GRAMMARS TO INDIVIDUAL COMPONENTS OF A COMPUTER PROGRAM

(75) Inventors: Andrew J. Hunt, Medford, MA (US); William D. Walker, Nashua, NH (US); Johan Wouters, Portland, OR (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/369,577

(22) Filed: Aug. 6, 1999

(51) Int. Cl.$^7$ ............................................... G10L 15/28
(52) U.S. Cl. ...................................... 704/275; 704/255
(58) Field of Search ................................ 704/255, 251, 704/231, 275

(56) References Cited

U.S. PATENT DOCUMENTS

| | | | |
|---|---|---|---|
| 5,390,279 A | 2/1995 | Strong | 704/200 |
| 5,513,298 A | 4/1996 | Stanford et al. | 704/243 |
| 5,632,002 A | 5/1997 | Hashimoto et al. | 704/231 |
| 5,651,096 A | 7/1997 | Pallakoff et al. | 704/275 |
| 5,664,061 A | 9/1997 | Andreshak et al. | 704/275 |

OTHER PUBLICATIONS

Microsoft Press Computer Dictionary, Microsoft Press, Redmond, WA (1994), p. 65.*

* cited by examiner

Primary Examiner—William Korzuch
Assistant Examiner—Donald L. Storm
(74) Attorney, Agent, or Firm—Weingarten, Schurgin, Gagnebin & Lebovici LLP

(57) ABSTRACT

A system for incorporating speech recognition into a computer program, including a number of speech controller modules corresponding to program components within the computer program. Each speech controller module supports a speech recognition grammar having at least one rule, where the speech recognition grammar provides an interface to operations on the corresponding program component. The rules of the speech recognition grammar associate spoken commands with data stored in the corresponding program component. A rule may include a reference to another local rule, or to a rule in a different speech recognition grammar, in which case a "link" to the other rule is formed. In this way, the disclosed system allows rules from the same or different grammars to be combined together, in order to build complex grammars. Each speech controller module operates to dynamically enable one or more rules it contains within a speech recognizer, in response to detecting the occurrence of an associated enabling condition. The speech controller module receives a recognition result from the speech recognizer indicating that the speech recognizer has detected one or more tokens associated with an enabled rule. In response to receipt of the recognition result, a speech controller module operates to invoke a method on data within the corresponding program component, and passes the result on to other speech controller modules that are linked to the recognition rule corresponding to the result.

32 Claims, 6 Drawing Sheets

SYSTEM AND METHOD FOR INTERFACING SPEECH RECOGNITION GRAMMARS TO INDIVIDUAL COMPONENTS OF A COMPUTER PROGRAM

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Speech recognition systems provide computers with the ability to listen to user speech and determine what is said. Accordingly, these systems have the potential to revolutionize the way in which humans interact with computers. Current technology does not generally support unconstrained speech recognition, which would include the ability to listen to any speech in any context and transcribe it accurately. To achieve reasonable recognition accuracy and response time, current speech recognizers constrain what they listen for by using "recognition grammars", which are often simply referred to as "grammars". Grammars define the words that may be spoken by a user and the patterns in which they must be spoken.

The two major types of grammars are rule grammars, which are also known as command and control grammars or regular grammars, and dictation grammars, which are also known as statistical language models. A rule grammar specifies a set of commands a user might say. For example, a simple window control rule grammar might enable a user to speak such utterances as "open a file", "close the window", and similar commands. A dictation grammar imposes fewer restrictions on what can be said, and accordingly is typically more complex than a rule grammar. Dictation grammars are typically used for free text entry in applications such as electronic mail and word processing.

Existing speech application development systems are often based on complex software architectures and Application Programming Interfaces (APIs) which require highly-specialized programmers, and which also make integration of speech input with traditional user interface modalities, such as a mouse or a keyboard, difficult and unreliable. In many existing systems, a single grammar or small set of grammars is defined for all parts of all applications. There is a strong tendency for such monolithic grammars to become large. As a result, they are difficult to update because of unexpected interactions, and also difficult to pass from one developer to another. Furthermore, because the speech design process is separate from other parts of the development process, the two efforts may easily lose synchronization, causing unexpected errors that may be difficult to trace. Accordingly, there is a need for a system for incorporating speech recognition into application and/or system service computer programs which does not require or rely on development and maintenance of a single, monolithic recognition grammar. The system should be relatively easy to use and maintain, while still allowing for sophisticated and complex user inputs.

BRIEF SUMMARY OF THE INVENTION

In accordance with principles of the invention, a system and method for incorporating speech recognition into a computer program is disclosed. The disclosed system includes a number of speech controller modules corresponding to program components within the computer program. Each speech controller module supports a speech recognition grammar having at least one rule, where the speech recognition grammar provides an interface to operations on the corresponding program component. The rules of the speech recognition grammar associate spoken commands with data and state stored in the corresponding program component, and with the functional capabilities of the program component.

Individual rules may include speakable tokens, which are portions of speech that are recognizable by a software or hardware speech recognizer. A rule may also include a reference to another rule local to the same recognition grammar, or to a rule in a different speech recognition grammar. Where the reference is to a rule in a different speech controller module, there is said to be a "link" to the other speech controller module based on this reference. In this way, the disclosed system allows rules from the same or different grammars to be combined together, in order to build complex grammars that combine the functionality of multiple components.

Each speech controller module may further include a list of references to rules in grammars stored in one or more other speech controller modules. Through this feature, rules defined by other speech controller modules may be conveniently referenced, as if they were local rules, by a rule in the speech controller module in which they are listed.

In one embodiment, each speech controller module operates to dynamically enable one or more rules defined in its grammar loaded into the speech recognizer, in response to detecting the occurrence of an associated enabling condition. The speech recognizer, for example, activates specific enabled rules or grammars that have been loaded into the speech recognizer in response to predetermined events. The speech controller module receives a recognition result from the speech recognizer indicating that the speech recognizer has detected one or more tokens associated with an enabled rule. In response to receipt of the recognition result, a speech controller module operates to invoke a method on data within the corresponding program component, and passes the result on to other speech controller modules that are linked to the recognition rule corresponding to the result.

In another embodiment, a command from the computer program, modification of data, and/or change of state in the corresponding program component, may cause a speech controller module to modify a grammar it contains dynamically either in part or in whole. For example, a grammar may be modified to associate one or more speakable tokens with data stored within the corresponding program component in response to such a command.

Thus there is provided a system for incorporating speech recognition into computer programs which does not require or rely on development and maintenance of a single, monolithic recognition grammar. The disclosed system is relatively easy to use and maintain, and allows for sophisticated and complex user inputs.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
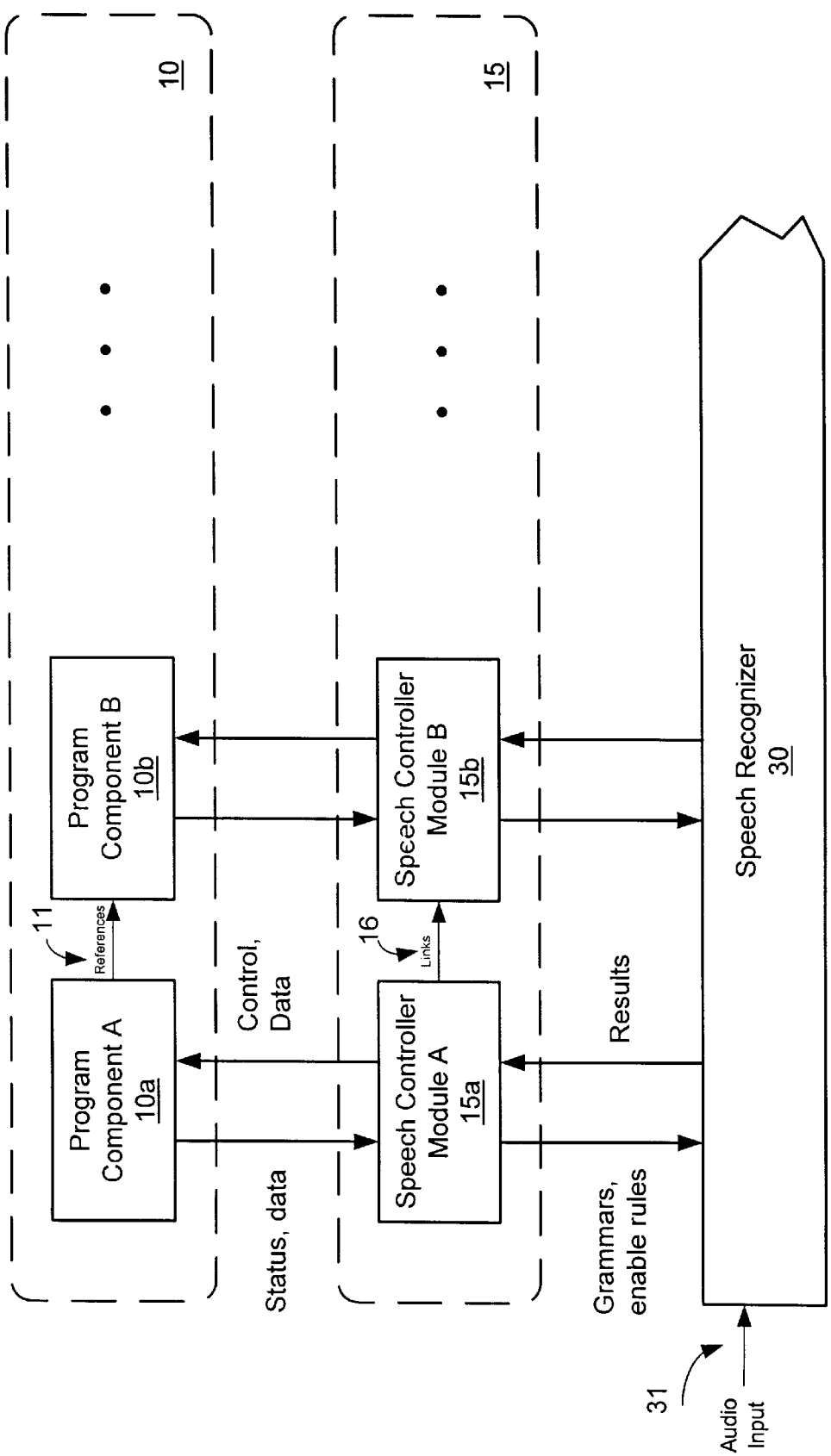
FIG. 1 shows a plurality of program components together with associated speech controller modules and a speech recognizer.

FIG. 1 shows a plurality of program components 10, together with corresponding speech controller modules 15, and a speech recognizer 30. The speech controller modules 15 include a speech controller module A 15a, corresponding to a program component A 10a, as well as a speech controller module B 15b, corresponding to a program component B 10b. The speech controller module A 15a and speech controller module B 15b may be associated by a number of links 16 between the rules defined by their grammars, as will be further described below. The program components 10 are for example input/output (I/O) related components within an application program. An illustrative program component 10a is associated with a button image displayed within a graphical user interface (GUI). In this case, the program component A 10a contains state and data information related to the button image. Such state information includes whether the button is pressed or armed. Such data includes a label or labels to be displayed as text within the button image, and potentially an icon image to be displayed when the button is represented as an icon. A button-related program component may also include functionality for generating a "clicked" event.

Each given one of the speech controller modules 15 process recognized speech/text detected by the recognizer in the speech input that match the grammars loaded by that speech controller. The semantic capabilities of an application program may be exposed to the user through the program components 10 by selecting the user interface related components of the application program as the set of program components 10. Accordingly, the full semantics of the application may be embodied in terms of speech control through the set of speech controller modules 15. In addition, or alternatively, the program components 10 may implement the underlying logic of an application program, and may be building blocks of larger components.

During operation of the embodiment shown in FIG. 1, the speech controller modules 15 load recognition grammars into the speech recognizer 30, and enable selected rules loaded within the speech recognizer 30. The speech recognizer 30 receives audio input 31, for example from a microphone interface. The speech controller modules 15 receive recognition results from the speech recognizer 30, as well as status and data from their corresponding program components. The speech controller modules provide control and data information to their corresponding program components in response to the results they receive from the speech recognizer 30.

The program components 10 may include references to each other, as illustrated by references 11 between program component A 10a and program component B 10b. The resulting reference structure may be reflected by a number of links between the corresponding speech controller modules 15. Links between speech controller modules are illustrated by links 16 between speech controller module A 15a and speech controller module 15b, which may be used to process certain recognition results received from the speech recognizer 30 using both speech controller module A 15a and speech controller module B 15b. In this way, the links between the speech controller modules 15 enable processing of recognition results by the speech controller modules 15 in a way that reflects the reference structure of the corresponding program components 10.

Figure 2:
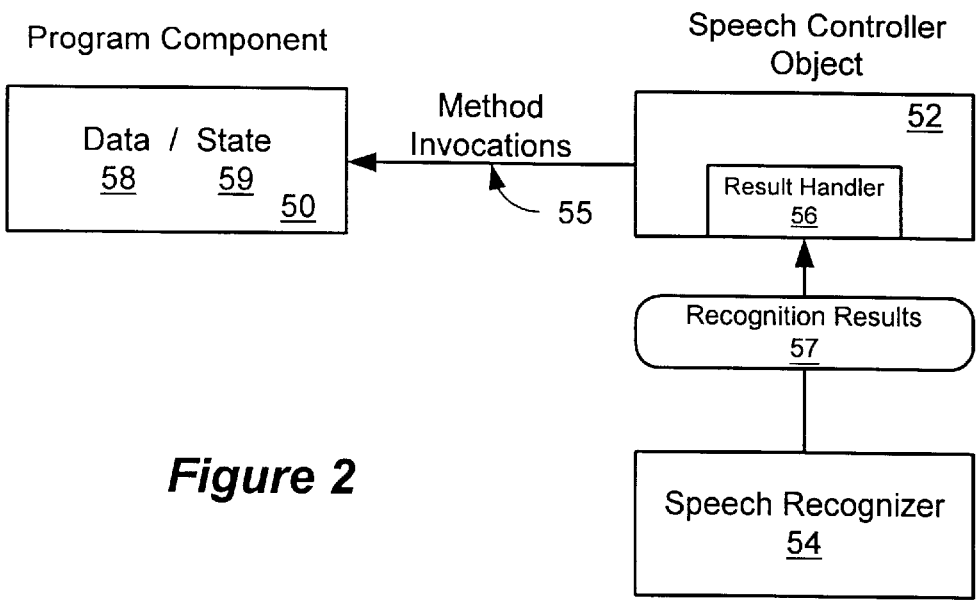
FIG. 2 shows an illustrative object-based embodiment of a program component and corresponding speech controller module, together with a speech recognizer.

FIG. 2 shows an illustrative object-oriented embodiment of a program component and a speech controller module. Specifically, FIG. 2 shows a program component 50 which encapsulates data 58 and state 59, and which may be operated on using one or more methods, as shown by method invocations 55. A speech controller object 52 is further shown including result handler software 56. During operation of the embodiment shown in FIG. 2, recognition results 57 are passed from the speech recognizer 54 to the speech controller object 52. Recognition results 57, for example, consist of a Result object, as described below, and may include a transcript of speech believed by the speech recognizer 54 to match one or more rules within a recognition grammar associated with the speech controller object 52. In response to receiving the recognition results 57, the speech controller object 52 performs operations on the corresponding program component 50, for example, through method invocations 55.

In an embodiment in which the program component 50 is associated with a button in a graphical user interface, the program component 50 may control the appearance of the button. The speech controller object 52, accordingly, defines a recognition grammar providing recognition of spoken commands related to the button and the text label it contains. For example, where the text in the button consists of "ok" or "continue", such commands could include "click ok", or "click continue", respectively. In this way the speech controller object 52 is designed to control the program component 50 through the methods of the program component 50, and/or trigger 'pressed' events. For example, where the button is the "Send" button in an email application which could be verbally pressed by saying "click send" or "send the email", which would result in a message being sent. Result handling for a single spoken utterance may involve multiple speech controllers that are linked in a tree, and may result in multiple method invocations by any or all of such controllers, as is described further detail below.

Figure 3:
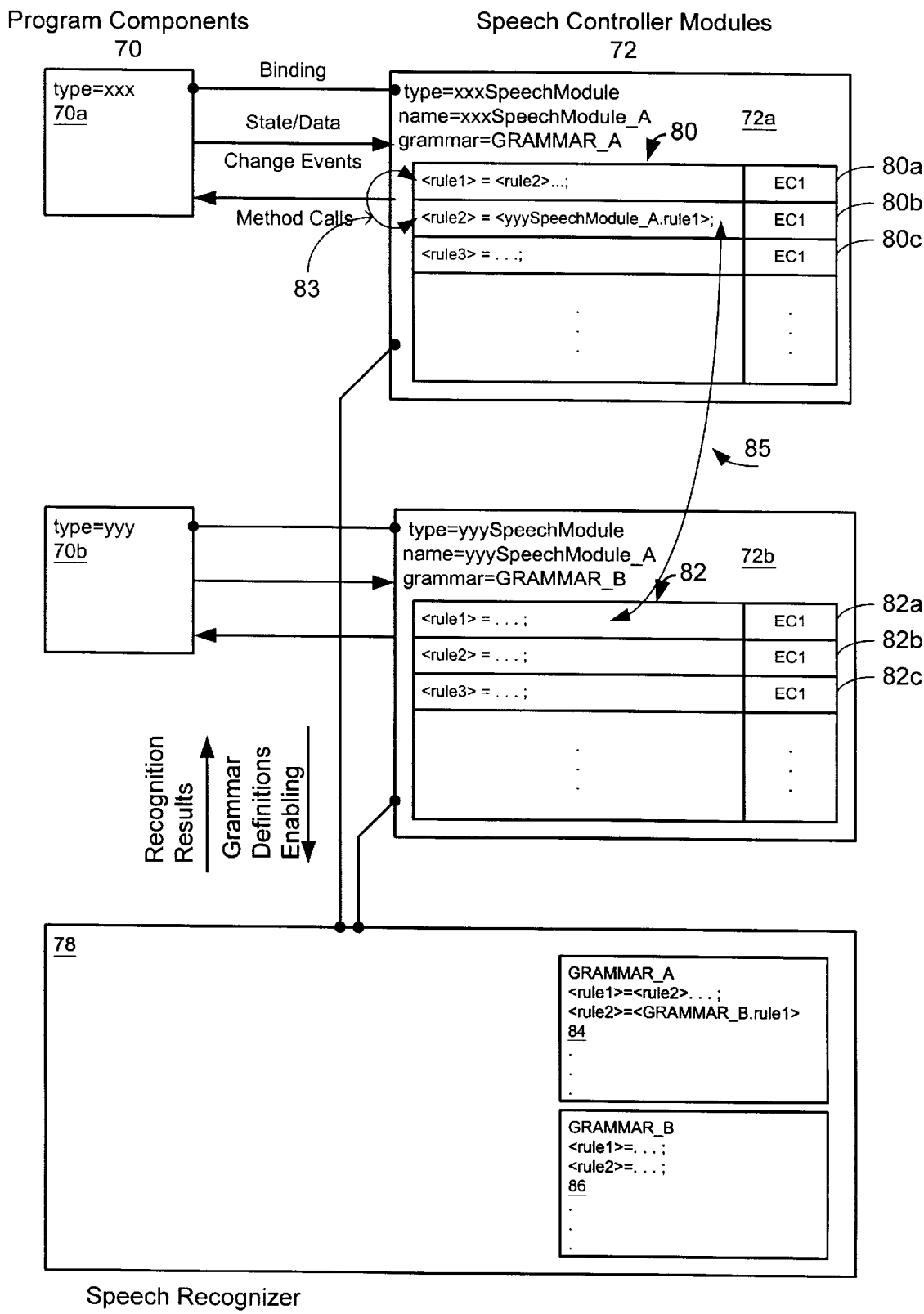
FIG. 3 shows a detailed view of an illustrative embodiment of program components and corresponding speech controller modules, together with a speech recognizer.

FIG. 3 shows an illustrative embodiment of program components 70 and speech controller modules 72, together with a speech recognizer 78. The program components 70 include a program component 70a of type xxx, as well as a program component 70b of type yyy. The speech controller modules 72a and 72b correspond to the program components 70a and 70b, respectively, and are of type xxxSpeechModule and yyySpeechModule. A unique name is provided for each speech controller module 72, for example xxxSpeechModule__A for speech controller module 72a and yyySpeechModule__A for speech controller module 72b. The grammars stored within the speech controller modules 72 are each provided with unique names, for example Grammar__A and Grammar__B respectively, which are for example used to identify the grammars when they are loaded into the name space of the speech recognizer 78. Various naming conventions may be used, such as naming of each speech module instance and the grammar it contains based on the name or type of the corresponding program component. Alternatively, any naming methodology may be used which guarantees that instances of speech controller modules and the grammars they contain are uniquely named and that a unique mapping is available from controller name to grammar name and vice versa.

The grammar within speech controller 72*a* is stored within a table 80, which includes a number of entries, 80*a*, 80*b*, 80*c*, etc. Each entry in the table 80 includes a rule definition and one or more enabling conditions. For example, entry 80*a* includes a definition for rule1 together with enabling condition EC1, entry 80B includes a definition for rule2 together with an enabling condition EC2, etc. Similarly, speech controller module 72*b* includes a table 82, which includes a number of entries 82*a*, 82*b*, 82*c*, etc. Each entry in the table 82 includes a rule definition and an associated enabling condition or conditions. In another embodiment, each table within the speech controller modules 72 further may include an associated action or actions for each table entry, such that the speech controller module may perform the action for a given table entry when a recognition result matches the rule in that table entry. Thus, each table entry defines what may be referred to as an "expression". Each expression of a speech controller module embodies a single rule that defines one way of talking about the associated program component. Furthermore, the rule will define all possible token sequences that represent the same way of talking about the application component. A single expression may represent a complete command, question, statement of data input or other sentence of natural language. Alternatively a single expression may represent any part of a command, question or other legal phrase of natural language and that expression may be referenced by the rule of other expressions as they build complete sentences. Because expressions are tied to actions and to enabling conditions it is typical that a single expression will convey one or more specific user intentions, one or more pieces of information, or other similar semantic content.

During operation of the embodiment shown in FIG. 3, the speech controller modules 72*a* and 72*b* load the recognition grammars they contain into the speech recognizer 78, including the rules defined in tables 80 and 82 respectively. The speech recognizer 78 maintains an "enabled" or "not enabled" status of each rule that reflects whether the condition or conditions that enable that rule have been satisfied or not. As a speech controller module detects, or is notified, that an enabling condition has been satisfied, for example by detecting a change in the data or state of its corresponding program component, the speech controller module modifies the status of that rule in the speech recognizer 78 to "enabled". The speech recognizer 78 will perform recognition only on those rules whose status is indicated as "enabled".

Further during operation of the embodiment shown in FIG. 3, when one of speech controller modules 72 loads a grammar into the speech recognizer 78, it "attaches" to either the grammar or the speech recognizer as a "listener", as further described below, in order to receive recognition results.

As illustrated in FIG. 3, rules within recognition grammars may be linked together by references. For example, rule2 as shown in entry 80*b* of table 80 for speech controller module 72*a*, contains a reference <yyySpeechModule_A.rule1> indicating rule1 defined in speech controller module 72*b*. In this way, rule2 in speech controller module 72*a* incorporates rule1 of speech controller module 72*b* into its definition, thus forming link2 85 between rule1 in table 80 and rule2 in table 82, and between speech controller module 72*a* and speech controller module 72*b*. Similarly, rule1 in entry 80*a* contains a reference to the local definition <rule2>, thus forming link1 83 between rule1 in table 80 and rule2 in table 80. The definition of rule2 thus becomes incorporated into the definition of rule1.

In general, a set of rules that are linked together forms a reference tree, with the referring rules at higher levels and the referred-to rules at progressively lower levels. Specifically, a link from rule A to rule B is established when the definition of rule A includes a reference to rule B. Rule A is said to be a "parent" of rule B, and rule B is said to be a "child" of rule A. A single rule may have zero or more children, and may be referred to by multiple parents. Links may be made within or across speech controller modules.

In the embodiment of FIG. 3, rule1 in speech controller 72*a* is the root of a reference tree including rule1 of speech controller module 72*a*, which in turn references rule1 of speech controller 72*b*. As described above, when speech controller module 72*a* loads GRAMMAR_A into the speech recognizer 78, it attaches to the speech recognizer 78 such that recognition results relating to GRAMMAR_A are passed to it. When a recognition result is passed to speech controller module 72*a*, speech controller module 72*a* parses text included in the result which the recognizer believes matches one or more rules defined in $GRAMMAR_{13}$ A. In one embodiment, the speech recognizer identifies a rule it believes to be the top level rule (or "root") of a reference tree matching the speech input. The parsing may be performed using conventional techniques available to compare the result text (also referred to as a "token sequence") against a grammar also indicated by the result. This procedure determines which words of the result text match which rules in the indicated reference tree, for example by beginning at the root of the tree and moving down. The parsing is for example performed using a mechanism provided by the speech recognizer interface, and results in a parse tree containing those words in the result text matching the rules in the reference tree indicated in the result. Each node of the parse tree contains some subset of the result text matching one of the rules in the reference tree. While a rule may have more than one parent in the reference tree, a subset of the result text will only have one parent in the parse tree.

The parse tree is then passed to an "Expression" object associated with the root rule of the reference tree. In an exemplary embodiment, Expressions encapsulate a rule and its associated enabling conditions and actions. The root Expression object interprets the words in the result to perform any actions associated with it, and passes sub-trees of the parse tree to Expression objects associated with each immediate child rule of the root rule. This process continues recursively until an Expression is reached that is associated with a rule that contains no sub-rules. The actions associated with a rule in an Expression may be performed either before or after the recursive processing of child rules in the reference tree.

Specifically with reference to the elements of FIG. 3, based on parsing of the recognition results, the speech controller module 72*a* determines, for example from the result itself, which rule or rules within its grammar are matched by the text. If any of the matching rules contain references to rules defined in the recognition grammar of another speech controller module, such as rule1 of speech controller module 72*b*, then speech controller 72*a* passes on that portion of the text matching the referred to rule to the Expression object associated with that rule in speech controller module 72*b*. The Expression in speech controller module 72*b* then matches the portion of the recognition results to its rule1 and further passes on any sub-portions of the result that match rules referenced by rule1 to the Expression objects associated with those rules, whether the rules are contained in the local speech controller module or are contained in the grammars of other speech controller modules. This process continues until the result has been passed to all Expression objects defining a rule in the reference tree, of which rule2 of speech controller module 72*a* is the root.

Further as shown in FIG. 3, the rules within grammars 84 and 86, as loaded into the speech recognizer 78, are referenced within a name space used within the speech recognizer 78. Accordingly, the grammar 84 is referred to within the speech recognizer by the unique name GRAMMAR_A, while the grammar 86 is referred to within the speech recognizer 78 by the unique name 86. The first rule within the grammar 86 may therefore be referred to as <GRAMMAR_B.rule1>, as shown in FIG. 3.

Following processing of a result fragment, an Expression associated with a child rule in the reference tree may pass data to an Expression associated with a parent rule. The Expression of the parent rule may then use the data in performing its own actions, or pass it on up to an Expression associated with a parent to its own rule in the reference tree. Passing data up the reference tree enables increasingly sophisticated behavior at higher levels of the reference tree. Similarly, a child rule may pass indication of changes in its definition to parent rules.

Several advantages of the disclosed system are illustrated by this embodiment. First, because each action associated with a rule is performed in response to specific spoken input, and because in a well-designed application that action is performed by the speech controller module associated with a particular program component on which the action is defined, and because that speech controller module includes the code to perform the action, there is localization of the actions performed in response to spoken input. In other words, the actions that can be performed by spoken commands on a specific program component object type are a function of the associated speech controller module object type, as are the Expression objects that encode (through their rule definitions) ways to trigger those actions by spoken text. Because zero, one or multiple actions may be defined in any Expression, actions may be defined at any point in a reference tree, compound actions may be used to support complex and natural user interactions.

In these ways, the mechanism for interpreting words in the result text and converting them into actions is advantageously made local to the speech controller module, and thus may be customized for a specific program module object type. However, in one embodiment, one or more "tags" may be associated with a rule in an Expression, where such tags are easily convertible to computer-interpretable actions understood by the relevant program component.

Another advantage arises from the fact that an Expression has access only to portions of the parse tree for its rule definition and those of the next lower level of rules in the reference tree, and no access to actions and data associated with higher levels. This encapsulation/data-hiding simplifies the job of designing speech controller modules.

As a result of actions performed during processing of a recognition result, the state or data of a program component may change in such a way that any number of Expressions of one or more speech controller modules may change. Notifications of these changes are provided by the program components to their associated speech controller modules. The Expressions of these speech controller modules must be changed as necessary, and the Expression objects associated with any parent rules in the respective reference trees must be notified that such changes have been made. Grammar changes associated with such updates must be committed as needed to the speech recognizer, as described below.

Figure 4:
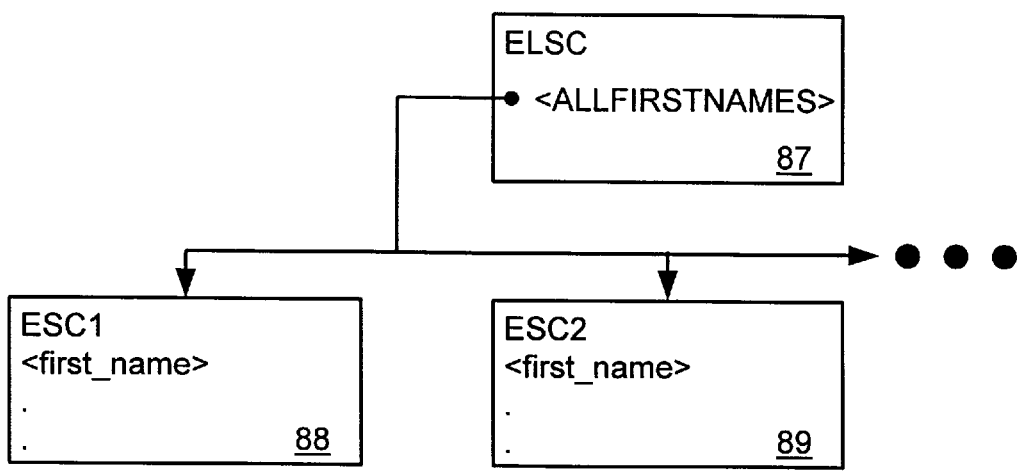
FIG. 4 is a diagram of a directed, acyclic graph representing link relationships between rules defined in different speech controller modules.

FIG. 4 shows an example of a reference tree for an employee list data structure which contains information related to a set of employees. In the embodiment of FIG. 4, there is an object class Employee, instances of which are used to encapsulate information for individual employees, such as their name and/or employee identification number. A speech controller module class EmployeeSpeechController is used to provide speech controller modules for each instance of Employee. Instances of EmployeeSpeechController are shown as elements ESC1 88 and ESC2 89. A class EmployeeList is defined to contain Employee objects associated with each employee in the list. A speech controller module type EmployeeListSpeechController corresponds to the EmployeeList object. An instance ELSC of EmployeeListSpeechController is shown as element 87 in FIG. 4. The EmployeeSpeechController grammar includes rules such as <first_name>, <last_name>, <full_name>, and/or <Id_Number>. An example of an EmployeeListSpeechController grammar rule would be:

<all_first_names> = <esc1.first_name> | <esc2.first_name> . . .

In this way a reference tree as shown in FIG. 4 is formed having the <all_first_names> rule as the root and the <first_name> rules of the speech controller modules corresponding to the individual employee objects as the child nodes 88 and 89.

Illustrative Grammar Format

An illustrative rule grammar format is now described. In the illustrative grammar format, each rule may be referred to by a "fully qualified rule name" that is unique across all grammars. A reference to a rule is represented by the rule's fully qualified name in surrounding < >characters. Rules may be defined as "public", in which case they are visible to other grammars. An "import" declaration allows one or all of the public rules of another grammar to be referenced locally. Examples of import declarations are as follows:

import <FullyQualifiedRuleName>;
import <GrammarName.*>;

The first example imports a single rule by its fully qualified rule name. The second import statement requests the import of all public rules of a grammar referred to by its unique GrammarName. The public rules of the designated grammar may be referenced locally. An import statement is optional when an imported rule is always referenced by its fully-qualified rule name.

In the illustrative grammar format, each rule is defined in a rule definition. Two patterns for rule definitions are:

<RuleName> = RuleExpansion ;
public <RuleName> = RuleExpansion ;

The components of the rule definition are (1) an optional public declaration, (2) the name of the rule being defined, (3) an equals sign '=', (4) the expansion of the rule, and (5) a closing semi-colon ';'. The rule expansion defines how the rule may be spoken. The rule expansion is a logical combination of tokens and references to other rules. A single rule may expand into many spoken words plus the expansions of other rules. Any rule in a grammar may be declared as public by the use of the public keyword.

Rule Expansion

Rule expansions may consist of a token and/or a reference to a rule. For example, <a> = elephant;
<b> = <x>;
<c> = <com.acme.grammar.y>;

The rule <a> expands to a single token "elephant". Thus, to speak <a> the user must say the word "elephant". The rule <b> expands to <x>. This means that to speak <b>, the user must say something that matches the rule <x>. Similarly, to speak rule <c> the user must speak something that matches the rule identified by the fully qualified name com.acme.grammar.y.

A rule may be defined by a sequence of expansions. A sequence of legal expansions, each separated by any number of spaces, is itself a legal expansion. For example, because both tokens and rule references are legal expansions, the following are both legal rule definitions:

<where> = I live in Boston;
<statement> =this <object> is <OK>;

The items in a sequence may be any legal expansion. This includes logical structures such as alternatives and groups. A rule may be defined as a set of alternative expansions separated by a predetermined character or characters such as a vertical bar '|'. For example:

<name> = Michael | Yuriko | Mary | Duke | <otherNames>;

To say the rule <name>, the speaker must say one, and only one, of the items in the set of alternatives. For example, a speaker could say "Michael", "Yuriko", "Mary", "Duke" or anything that matches the rule <otherNames>. However, the speaker could not say "Mary Duke".

Any permitted expansion may be explicitly grouped using matching parentheses '( )'. In such an embodiment, grouping has high precedence and so can be used to ensure the correct interpretation of rules. For example, because sequences have higher precedence than alternatives, parentheses are required in the following rule definition so that "please close" and "please delete" are permitted.

<action> = please (open | close | delete);

The following example shows a sequence of three items, with each item being a set of alternatives surrounded by parentheses to ensure correct grouping:

⟨command⟩ = (open | close) (windows | doors)

(immediately | later);

For the speech recognizer to recognize <command>, the speaker must say one word from each of the three sets of alternatives: for example, "open windows immediately" or "close doors later". Square brackets may be placed around any rule definition to indicate that the contents are optional. In other respects, the square bracket is equivalent to parentheses for grouping and has the same precedence.

Weights may be attached to the elements of a set of alternatives to indicate the likelihood of each alternative being spoken. A weight is a floating point number surrounded by forward slashes, e.g. /3.14/. The higher the weight, the more likely it is that an entry will be spoken. The weight is placed before each item in a set of alternatives.

Further in the illustrative grammar format, unary operators may be provided in rule expansions. For example, the unary operators are '*' (meaning repeat zero or more times), '+' (meaning repeat one or more times) and tags (attachment of an arbitrary string to any legal expansion). Unary operators share the following features:

1) A unary operator may be attached to any legal rule expansion.
2) A unary operator has high precedence: it attaches to the immediately preceding rule expansion.
3) Only one unary operator can be attached to any rule expansion (there is an exception to this rule for tags).

For example, a rule expansion followed by the asterisk symbol indicates that the expansion may be spoken zero or more times. Accordingly, <command> = <com.acme.politeness.startPolite> * don't crash;

might allow a user to say things like "please don't crash", "oh mighty computer please please don't crash", or to ignore politeness with "don't crash" (see below for an example public rule definition of <com.acme.politeness.startPolite>).

Tags provide a mechanism in the illustrative grammar format for attaching information to parts of rule definitions. Tags may be used to simplify or enhance the processing of recognition results. Tag attachments do not affect the recognition of a grammar. Instead, the tags are attached to the result object returned by the speech recognizer. The software interface of the speech recognizer defines the mechanism for providing tags. As a unary operator, a tag may be attached to any legal rule expansion. The tag is for example a character string delimited by curly braces '{ }'. The tag attaches to the immediately preceding rule expansion. For example:

<rule> = <action> {tag in here};

The following is an example of the relative precedence of elements in a rule expansion. The list proceeds from highest to lowest precedence.

1. Rule name contained within angle brackets, and a quoted or unquoted token.
2. '( )' parentheses for grouping.
3. The unary operators.
4. Sequence of rule expansions.
5. '|' separated set of alternative rule expansions.

The following are examples of complete grammars.

EXAMPLE 1

Simple Command and Control

This example shows two basic grammars that define spoken commands for controlling a window.

grammar com.acme.politeness;

```
// Body
public <startPolite> = (please | kindly | could you |
oh mighty computer) *;
public <endPolite> = [ please | thanks | thank you ];
```

The illustrative politeness grammar is not useful on its own but is imported into the commands grammar to add to the conversational style.

```
grammar com.acme.commands;
import <com.acme.politeness.startPolite>;
import <com.acme.politeness.endPolite>;

/**
 * Basic command.
 */ public <basicCmd> = <startPolite> <command> <endPolite>;
<command> = <action> <object>;
<action> = /10/ open |/2/ close |/1/ delete |/1/ move;
<object> = [the | a] (window | file | menu);
```

The command grammar above defines a single public rule, <basicCommand>, which is composed of two imported rules, <startPolite> and <endPolite>, and three private rules, <command>, <action> and <object>. Both the <action> and <object> rules are sets of alternative words and the actions list has weights that indicate that "open" is more likely to be spoken than the others. The <command> rule defines a sequence in which <action> is followed optionally by "the" or "a" and always by an <object>.

Because <com.acme.commands.basicCommand> is public, it can be made active for recognition. When it is active, the Recognizer will issue recognition results when the user speaks commands such as:

"open a window"

"close file please"

"oh mighty computer please open a menu"

EXAMPLE 2

Resolving Names

The following example grammar illustrates the use of fully-qualified names for an application that deals with clothing. The two imported grammars define import rules regarding pants and shirts, including the lists of colors that shirts and pants may have. The local <color> rule is a combination of the imported color lists. Because a reference to <color> is ambiguous (it could come from either the pants or shirts grammar), fully-qualified rule names are required.

```
grammar com.acme.selections;
import <com.acme.pants.*>;
import <com.sun.shirts.*>;

<color> = <com.acme.pants.color> |
<com.acme.shirts.color>;
public <statement> = I like <color>;
```

The reference to <color> in the last rule definition is not ambiguous: because local rules have precedence over imported rules, it refers to the locally-defined <color> rule.

Illustrative Speech Recognizer

An illustrative embodiment of a speech recognizer is now described. The illustrative speech recognizer includes a Recognizer interface to support speech recognition plus a set of supporting classes and interfaces. The Recognizer is for example a type of Engine object that converts speech to text. As a type of Engine, some portion of the functionality of the Recognizer is inherited from an Engine interface.

"Hello World!" Speech Recognizer Example

The following example shows an example of how the illustrative speech recognizer can be used. First, a grammar is provided to the speech recognizer that defines a number of words a user can say, and the patterns in which those words can be spoken. In this example, the grammar allows a user to say "Hello World" or a variant.

```
grammar speech.demo;

public <sentence> = hello world | good morning | hello
mighty computer;
```

Figure 5:
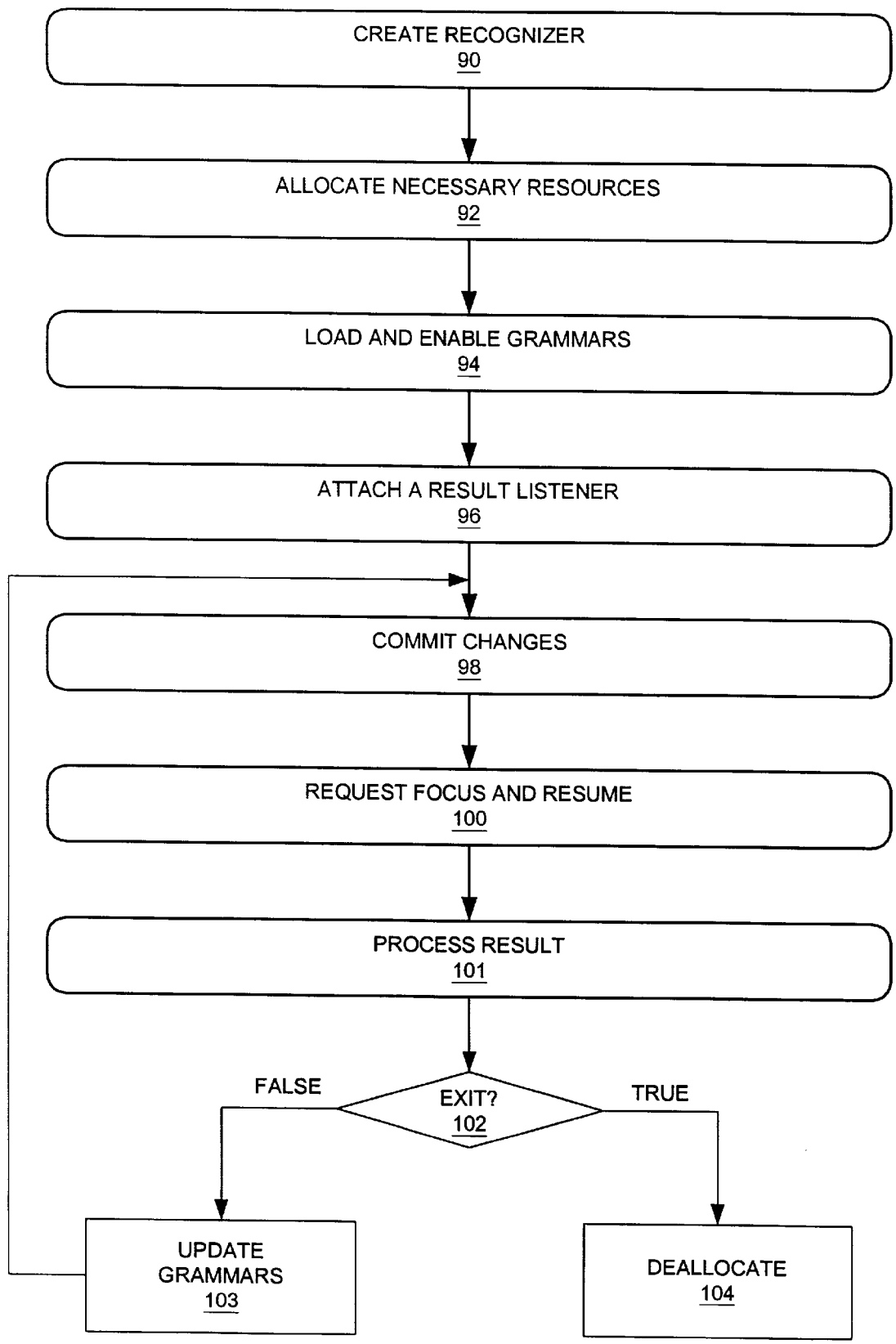
FIG. 5 is a flow chart showing an example of steps performed to operate a speech recognizer.

This grammar has a single public rule called "sentence". FIG. 5 illustrates how to create a Recognizer, load the grammar, and then wait for the user to say something that matches the grammar. When the recognizer detects a match, it deallocates the engine and exits.

At step 90 an instance of Recognizer is created by calling an associated method or system service. At step 92, necessary resources are allocated for the Recognizer. At step 94, a number of grammars are loaded into the Recognizer instance and enabled. Subsequently, any enabled grammars will be activated for recognition: that is, the Recognizer will begin comparing incoming audio to the active grammars and listening for speech that matches those grammars. As described below, in an exemplary embodiment, activation and other tangible effects of a grammar and enabling conditions upon recognition do not take effect until the "commit" as described below.

At step 96, one or more ResultListeners are attached to respective grammar objects loaded within the Recognizer. An attached ResultListener receives result events related to the grammar or grammars to which it is attached. These events indicate progress as the recognition of speech takes place. In one embodiment, a RESULT_ACCEPTED event is provided when the Recognizer completes recognition of input speech that matches an active rule within a grammar.

At step 98, any changes in grammars including the grammar enabled status and/or creation of a new grammar, are committed to take effect. At step 100, the Recognizer is put into a RESUMED state and a request for speech focus for the Recognizer is issued, for example by way of conventional Recognizer defined methods. At step 101, in the event that the user speaks something that matches an active grammar, a RESULT_ACCEPTED event is issued to the ResultListener attached to that grammar. The source of this event is for example a Result object that contains information about what the Recognizer heard, such as an array of tokens, each of which represents a single spoken word.

At step 102, the application checks whether an "Exit" indicator is "true" or "false". If "Exit" is "true", then step 102 is followed by step 104. Otherwise, step 102 is followed by step 103, in which grammars are updated as necessary. Step 102 is followed by step 98, thus repeating the steps 98 through 102 as needed.

At step 104, a deallocation method is called to free up the Recognizer's resources if the Recognizer is no longer required.

Recognizer as an Engine

The basic functionality provided by a Recognizer includes grammar management and the production of results when a user says things that match active grammars. In the illustrative embodiment, the Recognizer interface extends an Engine interface to provide this functionality. Some functionality may be inherited from the more general Engine type, while other functionality is specialized. For example, the definition of a Recognizer may add information about dictation capabilities and about users who have trained the engine. On the other hand, Recognizers may be searched, selected and created through methods inherited other classes. Recognizers may also inherit the basic state systems of an engine from an Engine class, including allocation states, pause and resume states, state monitoring methods and the state update events. In addition, Recognizers may produce a number of Engine defined events, while additionally providing events that are specific to Recognizers.

Recognizer State Systems—Inherited States

Figure 6:
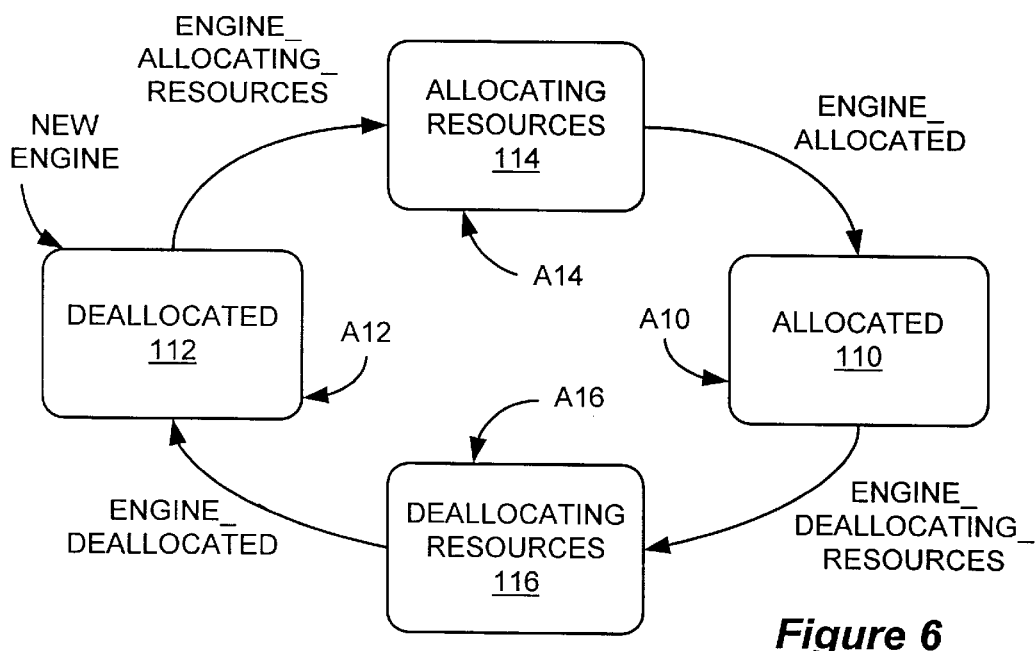
FIG. 6 is a state diagram of an Engine object.
Figure 7:
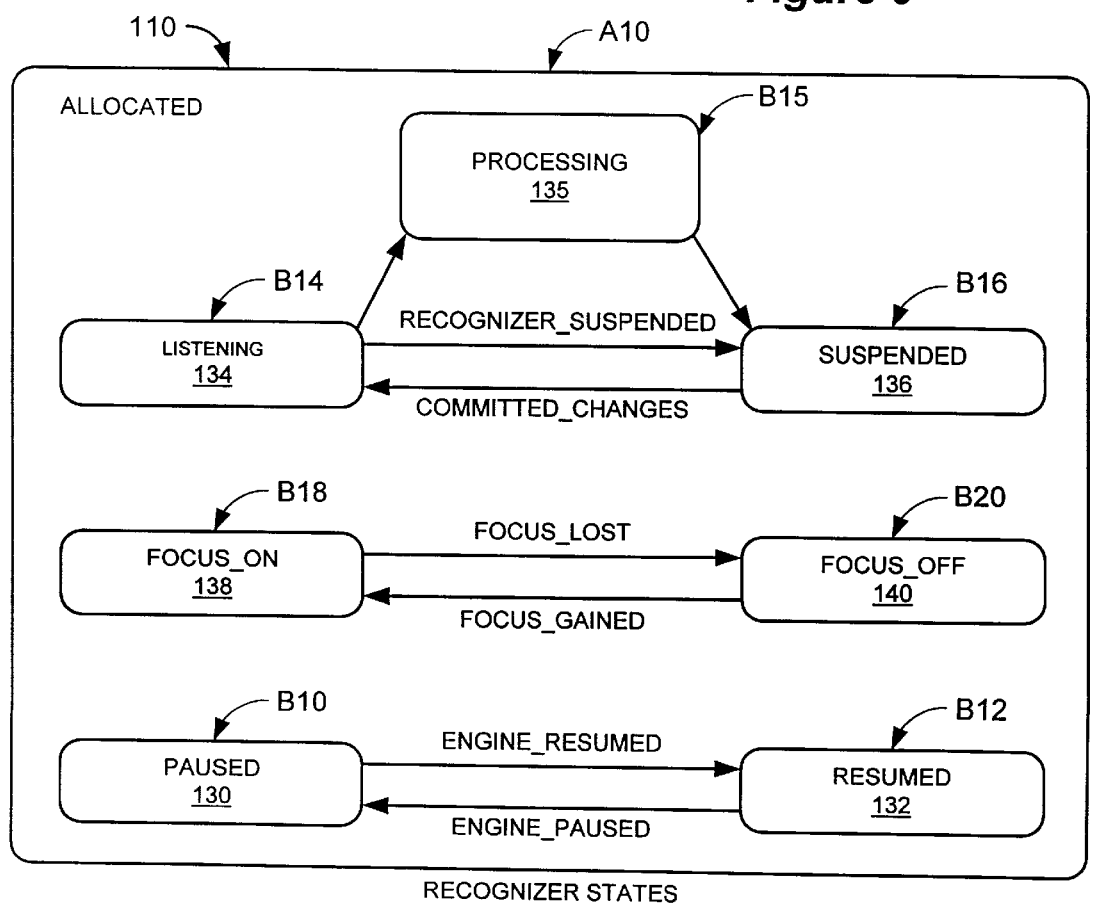
FIG. 7 is a state diagram of a Recognizer object.

As mentioned above, a Recognizer object may inherit basic state systems defined in an Engine interface. Two state systems added for Recognizers are provided. These two state systems represent the status of recognition processing of audio input against grammars, and the current Recognizer focus. A basic Engine state system as shown in FIG. 6, representing a current allocation state and whether resources have been obtained. The four allocation states are ALLOCATED 110, DEALLOCATED 112, ALLOCATING_RESOURCES 114 and DEALLOCATING_RESOURCES 116. As shown in FIG. 7, the PAUSED 130 and RESUMED 132 states are sub-states of the ALLOCATED 110 state that may also be inherited from Engine. The PAUSED 130 and RESUMED 132 states of a Recognizer indicate whether audio input is on or off. Pausing a Recognizer is analogous to turning off the input microphone.

As shown in FIG. 7, the illustrative Recognizer includes two sub-state systems within the ALLOCATED state A10 in addition to the inherited PAUSED and RESUMED sub-state system. These additional two new sub-state systems represent the current activities of a Recognizer's internal processing (the LISTENING 134, PROCESSING 135 and SUSPENDED 136 states) and the current Recognizer focus (the FOCUS_ON 138 and FOCUS_OFF 140 states). These sub-state systems are parallel states to the PAUSED 130 and RESUMED 132 states and operate independently as shown in FIG. 7.

The typical state cycle of a Recognizer starts in the LISTENING state 134, moves to the PROCESSING state 135 while a user speaks, moves to the SUSPENDED state 136 once recognition of that speech is completed and while grammars are updates in response to user input, and finally returns to the LISTENING state 134. In this event cycle a Result object is typically produced that represents what the Recognizer heard. Each Result has a state system as shown in FIG. C and further described below.

Another illustrative Recognizer event cycle also starts in the LISTENING state 134. Upon receipt of a non-speech event (e.g., keyboard event, mouse click, timer event) the Recognizer is suspended temporarily while grammars are updated in response to the event, and then the Recognizer returns to listening.

Speech Input Event Cycle

The typical recognition state cycle for a Recognizer occurs as speech input occurs. This cycle represents the recognition of a single Result. The cycle may be described as a clockwise trip through the LISTENING, PROCESSING and SUSPENDED states of an ALLOCATED recognizer as shown in FIG. 7.

The Recognizer starts in the LISTENING state 134 with a certain set of grammars enabled and active. When incoming audio is detected that may match an active grammar, the Recognizer transitions from the LISTENING state 134 to the PROCESSING state 135 with a RECOGNIZER_PROCESSING event.

The Recognizer then creates a new Result object and issues a RESULT_CREATED event (a ResultEvent) to provide the Result to ResultListeners, such as a speech controller module attached to a grammar including the rule associated with the Result. At this point the Result is usually empty: it does not contain any recognized words. As recognition proceeds words are added to the Result along with other useful information.

The Recognizer remains in the PROCESSING state 135 until it completes recognition of the Result. While in the PROCESSING state 135 the Result may be updated with new information.

The Recognizer indicates completion of recognition by issuing a RECOGNIZER_SUSPENDED event to transition from the PROCESSING state 135 to the SUSPENDED state 136. Once in that state, the Recognizer issues a result finalization event to ResultListeners (either a RESULT_ACCEPTED or RESULT_REJECTED event) to indicate that all information in the Result is finalized (words, grammars, audio etc.).

The Recognizer remains in the SUSPENDED state 136 until processing of the result finalization event is completed. Speech control modules may make grammar changes during the result finalization because the result causes a change in state or context relevant to their associated program module.

In the SUSPENDED state 136 the Recognizer buffers incoming audio. This buffering allows a user to continue speaking without speech data being lost. Once the Recognizer returns to the LISTENING state B14 the buffered audio is processed to give the user the perception of real-time processing.

Once the result finalization event has been issued to all listeners, the Recognizer automatically commits all grammar changes and issues a CHANGES_COMMITTED event to return to the LISTENING state. It also issues GRAMMAR_CHANGES_COMMITTED events to GrammarListeners of changed grammars. A speech controller receiving a GRAMMAR_CHANGES_COMMITTED event will pass the event on to any other speech controllers which are linked to one or more rules within the changed grammar. The commit applies all grammar changes made at any point up to the end of result finalization, such as changes made in the result finalization events. The Recognizer is now back in the LISTENING state 134 listening for speech that matches the new grammars.

In this event cycle the first two Recognizer state transitions (marked by RECOGNIZER_PROCESSING and RECOGNIZER_SUSPENDED events) are triggered by user actions: starting and stopping speaking. The third state transition (CHANGES_COMMITTED event) is triggered programmatically some time after the RECOGNIZER_SUSPENDED event. The SUSPENDED state 136 serves as a temporary state in which Recognizer configuration can be updated without loosing audio data.

Grammar Updates and Non-Speech Event Cycles

When a non-speech event occurs which changes the application state or application data it may be necessary to update the recognizer's grammars. The suspend and commitChanges methods of a Recognizer are used to handle non-speech asynchronous events. The typical cycle for updating grammars in response to a non-speech asynchronous events is as follows.

Assume that the Recognizer is in the LISTENING state 134 (the user is not currently speaking). As soon as the event is received, the speech controller calls suspend to indicate that it is about to change grammars. In response, the Recognizer issues a RECOGNIZER_SUSPENDED event and transitions from the LISTENING state 134 to the SUSPENDED state 136.

With the Recognizer in the SUSPENDED state 136, the speech controller makes all necessary changes to the grammars. Once all grammar changes are completed the speech controller calls the commitChanges method. In response, the Recognizer applies the new grammars and issues a CHANGES_COMMITTED event to transition from the SUSPENDED state 136 back to the LISTENING state 134, and issues GRAMMAR_CHANGES_COMMITTED events with respect to all changed grammars to all GrammarListeners for the modified grammars. Finally, the Recognizer resumes recognition of the buffered audio and then live audio with the new grammars.

Grammar Interface

Rule grammars can be defined to capture a wide range of spoken input from users by the progressive linking of simple grammars and rules. A Recognizer may have many rule grammars loaded at any time. The Grammar interface is the root interface that is extended by all grammars. The grammar functionality that is shared by all grammars is presented through this interface. The RuleGrammar interface is an extension of the Grammar interface to support rule grammars. The following are the capabilities presented by the Grammar interface:

Grammar naming: Every grammar loaded into a Recognizer must have a unique name. The getName method of a Recognizer returns that name. Grammar names allow references to be made between grammars. For example, a grammar from Acme Corp. for dates might be called "com.acme.speech.dates".

Enabling and disabling: Grammars may be enabled or disabled using the setEnabled method. When a grammar is enabled and when specified activation conditions are met, such as the Recognizer gaining focus, the grammar is activated. Once a grammar is active a Recognizer will listen to incoming audio for speech that matches that grammar.

Activation: the isActive method returns a Boolean value that indicates whether a grammar is currently active for recognition.

GrammarListener: the addGrammarListener and removeGrammarListener methods allow a GrammarListener to be attached to and removed from a grammar. The GrammarEvents issued to the listener indicate when grammar changes have been committed and whenever the grammar activation state of a grammar changes.

ResultListener: the addResultListener and removeResultListener methods allow a ResultListener to be attached to and removed from a grammar. This listener receives notification of all events for any result that matches the grammar.

Recognizer: the getRecognizer method returns a reference to the Recognizer that the grammar is loaded into.

Committing Changes

The disclosed system supports dynamic grammars; that is, it supports the ability for a speech controller module to modify grammars at runtime. In the case of rule grammars any aspect of any grammar can be changed at any time. After making any change to a grammar, a speech controller module must commit the changes. This applies to changes in definitions of rules or enabling conditions.

Changes are committed by calling the commitChanges method of the Recognizer. The commit is required for changes to affect the recognition process: that is, the processing of incoming audio. The commit changes mechanism has two important properties:

Updates to grammar definitions and the enabled property take effect atomically—all changes take effect at once. There are no intermediate states in which some, but not all, changes have been applied.

The commitChanges method is a method of Recognizer so all changes to all grammars are committed at once. Again, there are no intermediate states in which some, but not all, changes have been applied.

There is one instance in which changes are committed without an explicit call to the commitChanges method. Whenever a recognition result is finalized (completed), an event is issued to ResultListeners (it is either a RESULT_ACCEPTED or RESULT_REJECTED event). Once processing of that event is completed changes are normally committed. This supports the common situation in which changes are often made to grammars in response to something a user says.

Grammar Activation

A grammar is active when the Recognizer is matching incoming audio against that grammar to determine whether the user is saying anything that matches that grammar. When a grammar is inactive it is not being used in the recognition process.

Speech controller modules do not directly activate and deactivate grammars. Instead they provide methods for enabling and disabling a grammar or individual public rules within a grammar. The enabled state of a grammar is set with the setEnabled method and tested with the isEnabled method. Once enabled, certain conditions must be met for a grammar to be activated. The enabled flag and the activation mode are both parameters of a grammar that need to be committed to take effect. Changes need to be committed to affect the recognition processes.

Dynamic Grammars

Grammars may be dynamically modified and updated at execution time. The changes allow an application or speech controller module to account for shifts in the application's context, changes in the data available to it, and so on. For example, in an email application the list of known users may change during the normal operation of the program. The <sendEmail> command, <sendEmail> =send email to <user>;

references the <user> rule which may need to be changed as new email arrives. This code snippet shows the update and commit of a change in users.

Recognizer rec;
RuleGrammar gram;

String names[ ] = {"amy", "alan", "paul"};
Rule userRule = new RuleAlternatives(names);

gram.setRule("user", userRule);

// apply the changes
rec.commitChanges ( );

Recognition Results

A recognition result is provided by a Recognizer to a ResultListener when the Recognizer "hears" incoming speech that matches an active grammar. The result may provide words the user said and provides a range of other useful information, including alternative guesses and audio data.

Result Finalization

There are two illustrative ways to finalize a result which are signaled by the RESULT_ACCEPTED and RESULT_REJECTED events. A result is accepted when a Recognizer is confident that it has correctly heard the word s spoken by a user (i.e., the tokens in the Result exactly represent what a user said).

Rejection occurs when a Recognizer is not confident that it has correctly recognized a result: that is, the tokens and other information in the result do not necessarily match what a user said. Many applications will ignore the RESULT_REJECTED event and most will ignore the detail of a result when it is rejected. In some applications, a RESULT_REJECTED event is used simply to provide users with feedback that something was heard but no action was taken, for example, by displaying "???" or sounding an error beep.

Result Object Life Cycle

A Result is produced in response to a user's speech. Unlike keyboard input, mouse input and most other forms of user input, speech is not instantaneous. As a consequence, a speech recognition result is not produced instantaneously. Instead, a Result is produced through a sequence of events starting some time after a user starts speaking and usually finishing some time after the user stops speaking, although it is recognized that any delay period will continue to decrease as recognition methods improve and processing speeds increase.

Figure 8:
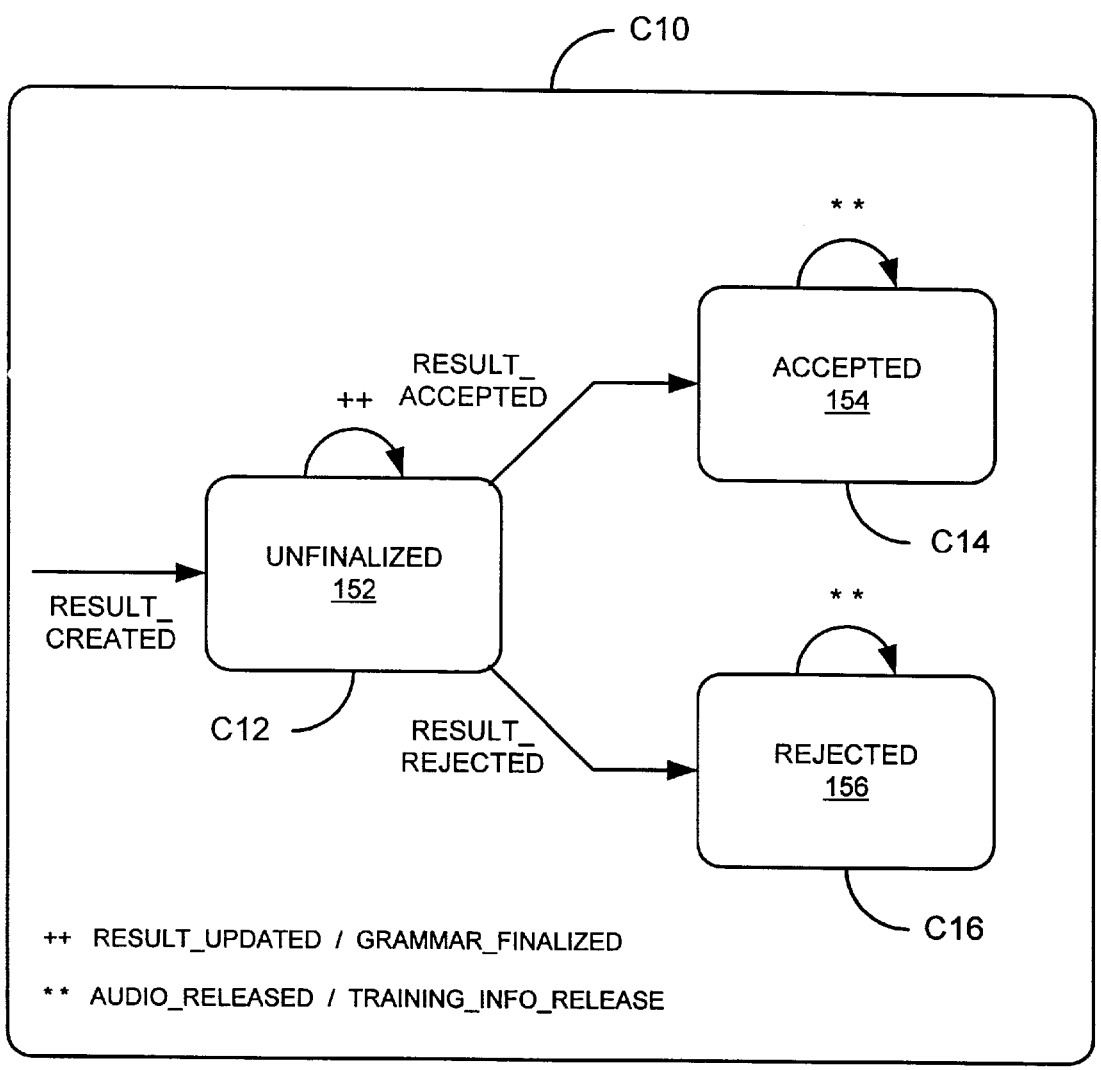
FIG. 8 is a state diagram of a Result object.

FIG. 8 shows the state system of a Result and the associated ResultEvents. As in the Recognizer state diagram (FIG. 6), the blocks represent states, and the labeled arcs represent transitions that are signaled by ResultEvents.

Every Result 150 starts in the UNFINALIZED state 152 when a RESULT_CREATED event is issued. While the result is unfinalized, the Recognizer provides information including finalized and unfinalized tokens and the identity of the grammar matched by the result. As this information is added, the RESULT_UPDATED and GRAMMAR_FINALIZED events are issued.

Once all information associated with the Result 150 is finalized, the Result 150 is finalized. A Result is finalized with either a RESULT_ACCEPTED or RESULT_REJECTED event placing it in either the ACCEPTED state 154 or REJECTED state 156. At that point all information associated with the result becomes available. Once finalized, the information available is fixed.

ResultListener Attachment

A ResultListener can be attached in one of three places to receive events associated with results: to a Grammar, to a Recognizer or to an individual Result. To support ResultListeners the Grammar, Recognizer and Result interfaces all provide addResultListener and removeResultListener methods. Depending upon the place of attachment, a listener receives events for different results and different subsets of result events.

Grammar: A ResultListener attached to a Grammar receives all ResultEvents for any Result that has been finalized to match that grammar. Because the grammar is known once a GRAMMAR_FINALIZED event is produced, a ResultListener attached to a Grammar receives that event and subsequent events.

Result: A ResultListener attached to a Result receives all ResultEvents starting at the time at which the listener is attached to the Result. Note that because a listener cannot be attached until a result has been created with the RESULT_CREATED event, it can never receive that event.

Recognizer: A ResultListener attached to a Recognizer receives all ResultEvents for all results produced by that Recognizer for all grammars. This form of listener attachment is useful when centralized processing of results is required. Only ResultListeners attached to a Recognizer receive the RESULT_CREATED event.

Recognizer and Result States

The state system of a Recognizer is tied to the processing of a Result. Specifically, the LISTENING 134, PROCESSING 135 and SUSPENDED 136 state cycle shown in FIG. 7 follows the production of an event. The transition of a Recognizer from the LISTENING state 134 to the PROCESSING state 135 with a RECOGNIZER_PROCESSING event indicates that a Recognizer has started to produce a Result. The RECOGNIZER_PROCESSING event is followed by the RESULT_CREATED event to ResultListeners. The RESULT_UPDATED and GRAMMAR_FINALIZED events are issued to ResultListeners while the Recognizer is in the PROCESSING state 135.

As soon as the Recognizer completes recognition of a result, it makes a transition from the PROCESSING state 135 to the SUSPENDED state 136 with a RECOGNIZER_SUSPENDED event. Immediately following that recognizer event, the result finalization event (either RESULT_ACCEPTED or RESULT_REJECTED) is issued. While the result finalization event is processed, the Recognizer remains suspended. Once the result finalization event is completed, the Recognizer automatically transitions from the SUSPENDED state 136 back to the LISTENING state 134 with a CHANGES_COMMITTED event. Once back in the LISTENING state 134 the Recognizer resumes processing of audio input with the grammar committed with the CHANGES_COMMITTED event.

Updating Grammars

In some situations, grammar definitions and grammar activation need to be updated in response to spoken input from a user. For example, if speech is added to a traditional email application, the command "save this message" might result in a window being opened in which a mail folder can be selected. While that window is open, the grammars that control that window need to be activated. Thus during the event processing for the "save this message" command grammars may need to be created, updated and enabled. All this would happen during processing of the RESULT_ACCEPTED event. For any grammar changes to take effect they must be committed.

Because this form of grammar update is common while processing the RESULT_ACCEPTED event (and sometimes the RESULT_REJECTED event), Recognizers implicitly commit grammar changes after either result finalization event has been processed. This implicit commit is indicated by the CHANGES_COMMITTED event that is issued when a Recognizer makes a transition from the SUSPENDED state 136 to the LISTENING state 134 following result finalization and the result finalization event processing.

One desirable effect of this form of commit becomes useful where multiple grammars are changed in response to a finalized result. If changes in multiple program modules are triggered by a finalized result event, and if many of the associated speech controller modules change grammars as a result, then they do not each need to call the commitChanges method. The downside of multiple calls to the commitChanges method is that a syntax check must be performed upon each. Checking syntax can be computationally expensive and so multiple checks are undesirable. With the implicit commit once all components have updated grammars computational costs are reduced.

Result Tags

Processing commands generated from a RuleGrammar becomes increasingly difficult as the complexity of the grammar rises. The illustrative speech recognizer provides two mechanisms to simplify the processing of results: tags and parsing.

A tag is a label attached to an entity within a RuleGrammar. The illustrative grammar format set forth above and the RuleTag class define how tags can be attached to a grammar. The following is a grammar for very simple control of windows which includes tags attached to the important words in the grammar.

```
grammar com.acme.actions;
public <command> = <action> <object> [<where>]
<action> = open {ACT_OP}| close {ACT_CL} | move {ACT_MV} ;
<object> = [a | an | the] (window {OBJ_WIN} | icon {OBJ_ICON});
<where> = [to the] (back {WH_BACK} | front {WH_FRONT} );
```

This grammar allows users to speak commands such as open window move the icon move the window to the back move window back The italicized words are the ones that are tagged in the grammar—these are the words that the attached listener or listeners care about. For example, in the third and fourth example commands, the spoken words are different but the tagged words are identical. Tags allow listeners to ignore trivial words such as "the" and "to".

Tags can also be used to handle synonyms—multiple ways of saying the same thing. For example, "programmer", "hacker", "application developer" and "computer dude" could all be given the same tag, say "DEV". An application that looks at the "DEV" tag will not care which way the user spoke the title.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to certain properties and features of the Java programming language and execution environment, the present invention is generally applicable to any other programming language or execution environment in which speech recognition is performed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

We claim:

1. A system for incorporating speech recognition into a computer program, comprising:

a plurality of program components within said computer program; and a plurality of speech controller modules, each of said speech controller modules corresponding to a respective one of said plurality of program components, wherein each one of said plurality of speech controller modules includes a speech recognition grammar, each one of said speech recognition grammars having at least one rule defined within said respective one of said plurality of speech controller modules.

2. The system of claim 1, wherein said at least one rule includes at least one speakable token.

3. The system of claim 1 wherein said at least one rule further includes at least one reference to at least one rule in another speech recognition grammar.

4. The system of claim 1 wherein said at least one rule further includes at least one reference to at least one other rule in said speech recognition grammar.

5. The system of claim 1, wherein each of said plurality of speech controller module associates said at least one rule with an action to be performed on data stored within said corresponding one of said plurality of program components.

6. The system of claim 5, wherein said at least one rule associates at least one speakable token with a data setting action to be performed on said data stored within said corresponding one of said plurality of program components.

7. The system of claim 5, wherein said at least one rule associates at least one speakable token with a command action for said corresponding one of said plurality of program components.

8. The system of claim 5, wherein said at least one rule associates at least one tag with a data setting action to be performed on said data stored within said corresponding one of said plurality of program components.

9. The system of claim 5, wherein said at least one rule associates at least one tag with a command action for said corresponding one of said plurality of program components.

10. The system of claim 1, wherein each one of said plurality of speech controller modules is operable to receive a recognition result from a speech recognizer, said recognition result indicating that said speech recognizer has detected a match between a portion of spoken input and a set of one or more speech tokens associated with said at least one rule.

11. The system of claim 10, wherein said speech controller module is operable to invoke a method on said respective one of said plurality of program components in response to receipt of said recognition result from said speech recognizer.

12. The system of claim 1, wherein each of said plurality of speech controllers operates to load said included speech recognition grammar into a speech recognizer.

13. The system of claim 12, wherein said plurality of speech controller modules further include at least one corresponding enabling condition associated with respective ones of said at least one rule, and wherein each of said at least one corresponding enabling condition describes an event that must occur prior to activation of said respective rule to which said enabling condition corresponds.

14. The system of claim 13, wherein said event comprises a state change within said corresponding one of said plurality of program components.

15. The system of claim 13, wherein said event comprises a data change within said corresponding one of said plurality of program components.

16. The system of claim 15, wherein said plurality of speech controller modules operate to detect when said at least one enabling condition has been satisfied, and further to provide indication to said speech recognizer responsive to said detection that said enabling condition has been satisfied.

17. The system of claim 16, wherein said indication includes an identity of said respective rule to which said enabling condition corresponds.

18. A method of incorporating speech recognition into a computer program, comprising:
    detecting, in a speech recognizer, a portion of spoken input corresponding to a rule in a first recognition grammar of a plurality of recognition grammars, each of said plurality of recognition grammars including at least one rule; and
    passing a recognition result to a first speech controller module, said first speech controller module being one of a plurality of speech controller modules, each of said speech controller modules corresponding to an associated one of a plurality of program components within said computer program, said first speech controller module including said first speech recognition grammar, wherein each one of said plurality of speech controller modules includes a corresponding one of said plurality of said speech recognition grammars.

19. The method of claim 18, further comprising including, by said speech recognizer, indication of said rule in said first recognition grammar in said recognition result.

20. The method of claim 18, further comprising:
    matching, by said speech recognizer, at least one speakable token within said rule to said portion of spoken input; and
    including said at least one speakable token within said recognition result.

21. The method of claim 18, further comprising:
    passing said recognition result to a second speech controller module, wherein said rule includes at least one reference to at least one rule in a speech recognition grammar included in said second speech controller module.

22. The method of claim 18, further comprising:
    performing, by said first speech controller module in response to receipt of said recognition result, an action associated with said rule, said action performed on data stored within one of said plurality of program components corresponding to said first speech controller module.

23. The method of claim 22, wherein said action performed by said first speech controller module includes invocation of a method on said respective one of said plurality of program components.

24. The method of claim 18, further comprising loading, by said first speech controller module, said first speech recognition grammar into said speech recognizer.

25. The method of claim 24, further comprising modifying, responsive to a change of state in said respective one of said plurality of program components, said loaded first speech recognition grammar.

26. The method of claim 24, further comprising modifying, responsive to a change of data in said respective one of said plurality of program components, said loaded first speech recognition grammar.

27. The method of claim 18, further comprising loading, by each one of said plurality of speech controller modules, said respective ones of said plurality of said speech recognition grammars into said speech recognizer.

28. The method of claim 18, at least one of said plurality of speech controller modules requesting, responsive to satisfaction of an enabling condition corresponding to a rule within said speech recognition grammar included within said speech controller module, that said speech recognizer activate said rule within said speech recognition grammar included within said speech controller module, wherein said enabling condition describes a condition that must be met prior to activation of said respective rule to which said enabling condition corresponds.

29. The method of claim 28, wherein said indication includes an identity of said respective rule to which said enabling condition corresponds.

30. A computer program product including a computer readable medium, said computer readable medium having a speech recognition computer program stored thereon, said speech recognition computer program for incorporating speech recognition into a second computer program, said speech recognition computer program comprising:
    program code for a plurality of speech controller modules, each of said speech controller modules including program code for receiving a recognition result from a speech recognizer, said recognition result generated by said speech recognizer in response to a portion of spoken input corresponding to a rule in a first recognition grammar of a plurality of recognition grammars, each of said plurality of recognition grammars including at least one rule, each of said speech controller modules including a respective one of said plurality of recognition grammars, each of said plurality of speech controller modules associated with a program component of said second computer program.

31. A computer data signal embodied in a carrier wave, said computer data signal including a speech recognition computer program, said speech recognition computer program for incorporating speech recognition into a second computer program, said speech recognition computer program comprising:
    program code for a plurality of speech controller modules, each of said speech controller modules including program code for receiving a recognition result from a speech recognizer, said recognition result generated by said speech recognizer in response to a portion of spoken input corresponding to a rule in a first recognition grammar of a plurality of recognition grammars, each of said plurality of recognition grammars including at least one rule, each of said speech controller modules including a respective one of said plurality of recognition grammars, each of said plurality of speech controller modules associated with a program component of said second computer program.

32. A system for incorporating speech recognition into a computer program, comprising:
    means for detecting a portion of spoken input corresponding to a rule in a first recognition grammar of a plurality of recognition grammars, each of said plurality of recognition grammars including at least one rule; and means for receiving a recognition result in a first speech controller module, said first speech controller module one of a plurality of speech controller modules corresponding to respective ones of a plurality of program components within said computer program, said first speech controller module including said first speech recognition grammar, wherein each one of said plurality of speech controller modules includes a respective one of said plurality of said speech recognition grammars.

* * * * *

UNITED STATES PATENT AND TRADEMARK OFFICE
CERTIFICATE OF CORRECTION

PATENT NO. : 6,374,226 B1
DATED : April 16, 2002
INVENTOR(S) : Andrew J. Hunt et al.

It is certified that error appears in the above-identified patent and that said Letters Patent is hereby corrected as shown below:

Column 6,
Line 27, "GRAMMAR$_{13}$A" should read -- GRAMMAR_A --;

Column 17,
Line 9, "word s" should read -- words --; and

Column 19,
Lines 28-31, read as follows:
"open window
move the icon
move the window to the back
move window back"

should read as follows:

-- *open window*
*move the icon*
*move the window to the back*
*move window back* --.

Signed and Sealed this

Thirteenth Day of May, 2003

JAMES E. ROGAN
*Director of the United States Patent and Trademark Office*